Dec. 16, 1924.   1,519,687
J. KLINGELE
TRIGGER RELEASED SUPPORTING MEMBER
Filed April 14, 1923   2 Sheets-Sheet 1
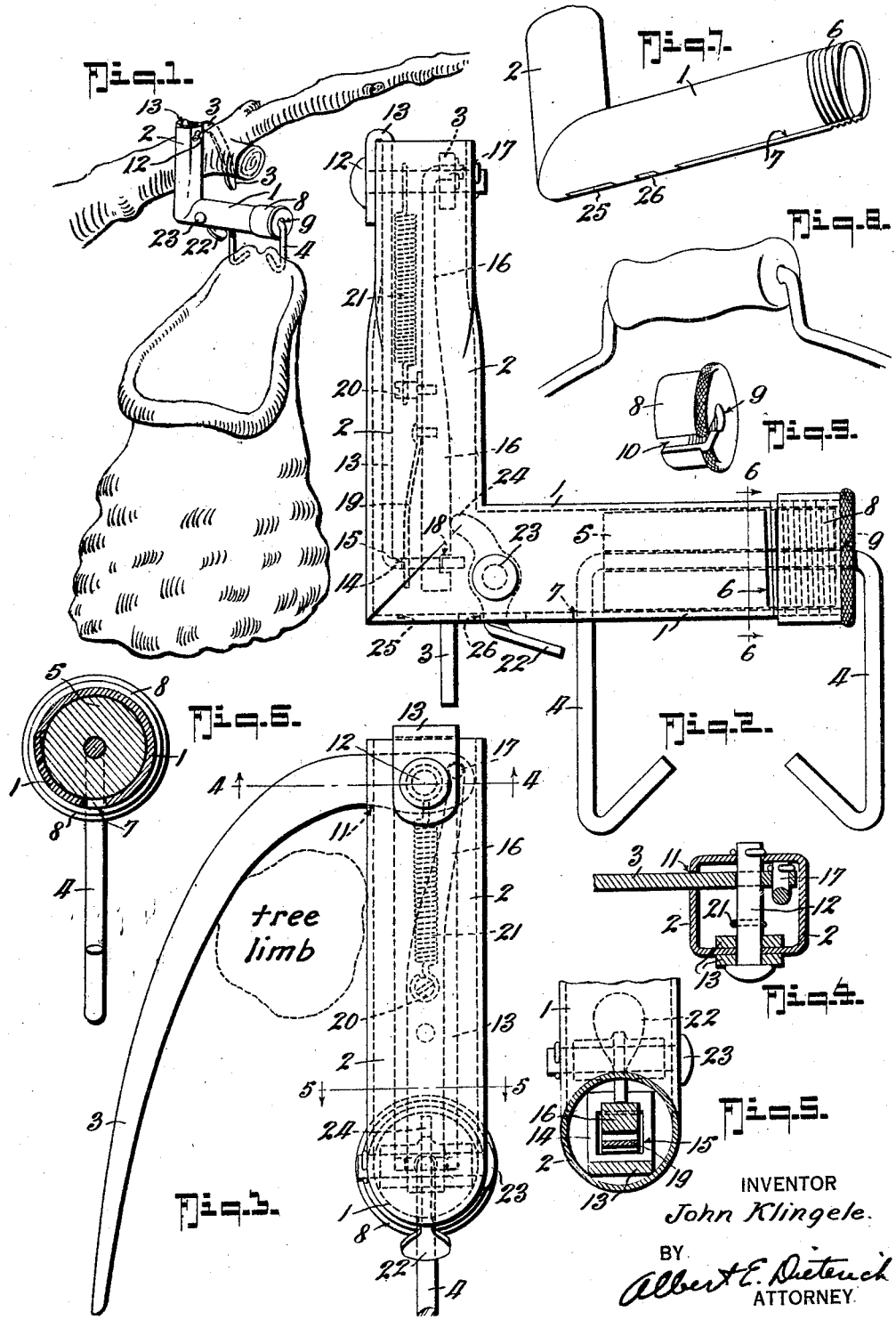
INVENTOR
John Klingele.
BY
Albert E. Dieterich
ATTORNEY

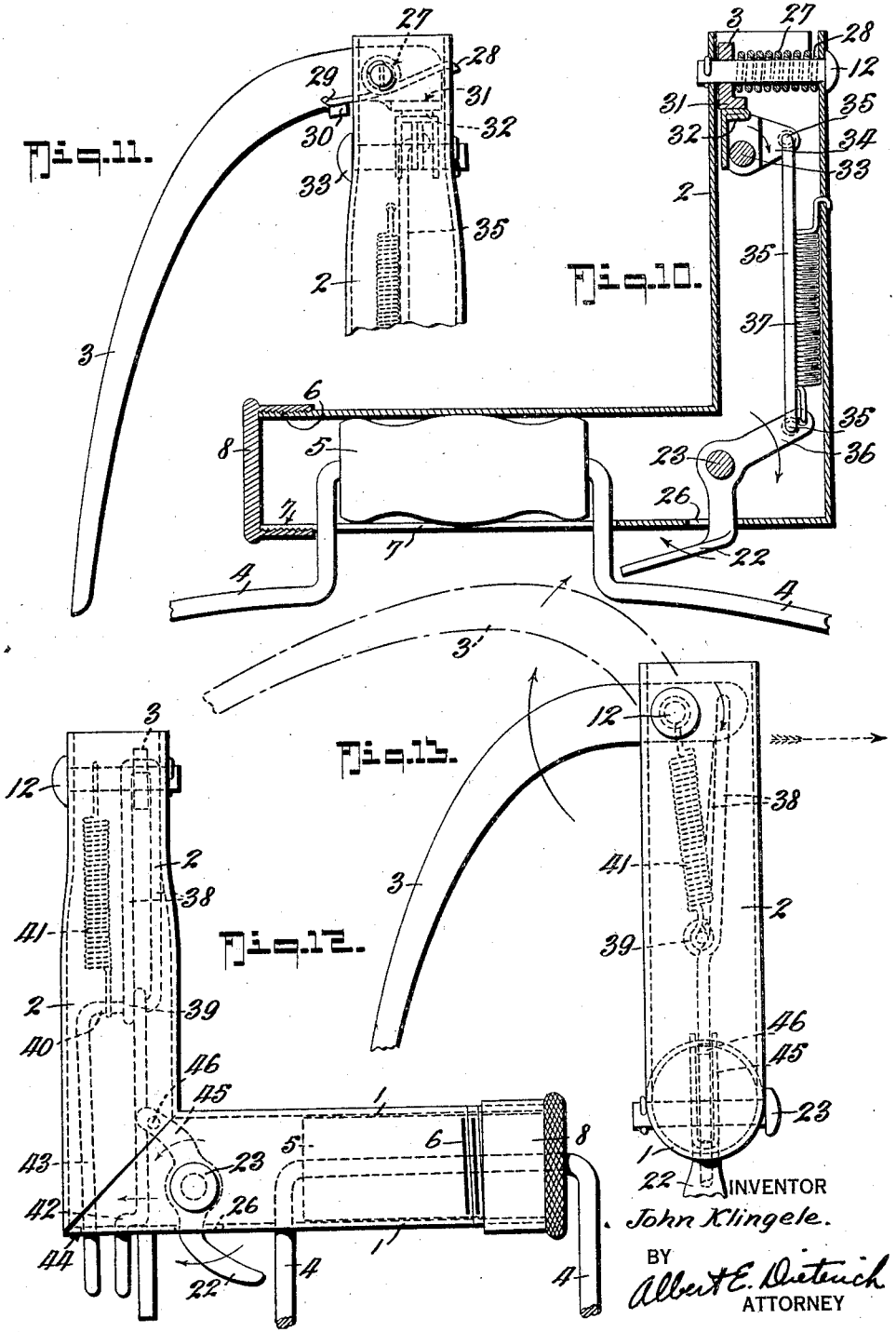

Patented Dec. 16, 1924.

1,519,687

UNITED STATES PATENT OFFICE.

JOHN KLINGELE, OF YAKIMA, WASHINGTON.

TRIGGER-RELEASED SUPPORTING MEMBER.

Application filed April 14, 1923. Serial No. 632,155.

*To all whom it may concern:*

Be it known that I, JOHN KLINGELE, a citizen of the United States, residing at Yakima, in the county of Yakima and State of Washington, have invented a new and Improved Trigger-Released Supporting Member, of which the following is a specification.

The invention resides in the provision of a supporting member adapted for use by fruit pickers and the like, whereby a product gathering container may be supported upon a tree limb or similar supporting means and automatically released therefrom by trigger action when desired.

The invention has for its object to provide a supporting member of the character stated, of a simple and compact nature, inexpensive and easy to manufacture and which will effectively serve its purpose of supporting the weight of the gathered product while the gathering is in progress and the proper releasing of the supporting action when the gathering is completed to capacity.

It its more detailed nature, the invention seeks to provide a member, of the character stated, which is adapted to be removably secured to a gathering bag or bucket to support the same upon a tree limb while fruit is being gathered, to thus relieve the gatherer of the weight thereof during the process of gathering.

The invention further has for its object to provide a simple and effective means for releasing the said supporting member from the supporting limb or other projection to transfer the weight thereof from said supporting medium to the gatherer and in such manner that the gatherer does not have to lift the gathered product in effecting such release and transfer of weight.

With the above and other objects in view that will hereinafter be apparent, the invention resides in those novel details of construction, combination of and arrangement of parts, fully described in the following detailed description, particularly pointed out in the appended claims and illustrated in the accompanying drawings in which:

Figure 1 is a perspective view showing the invention in operation.

Figure 2 is a side elevation of the invention, the parts being shown in the normal or load supporting position.

Figure 3 is an end elevation of the device as shown in Figure 2.

Figure 4 is a detail horizontal section, taken substantially on the line 4—4 on Figure 3, looking in the direction of the arrows.

Figure 5 is a similar view, taken on the line 5—5 of Figure 3, looking in the direction of the arrows.

Figure 6 is a detail vertical cross section taken substantially on the line 6—6 on Figure 2.

Figure 7 is a detail perspective view of the handle portion of the invention.

Figure 8 is a detail perspective view of the handle portion of a gathering bucket or other receptacle.

Figure 9 is a detail perspective view of the slotted handle end cover cap.

Figure 10 is a central longitudinal section of a slightly modified form of my invention.

Figure 11 is a fragmentary end elevation of the form of invention shown in Figure 10.

Figure 12 is a side elevation illustrating a further modification of my invention, and Figure 13 is an end elevation of the form of invention shown in Figure 12.

In the practical development of my invention, I provide an elbow casing formed of metal tubing or other suitable material and comprising a horizontal handle portion 1 and a vertical portion 2, and which is adapted to carry a supporting hook 3 in proper projected relation with said casing for being readily hooked over a tree limb or other supporting medium for properly supporting the load of gathered fruit or other produce suspended from the casing upon the bag supporting member 4, as is clearly indicated in Figure 1.

The supporting member 4 is formed of stout wire bent into substantially U shape, having the ends thereof bent into bag supporting hooks and having a wooden plug or handle member 5 mounted upon the cross bar thereof, which said handle member is adapted to be inserted into the threaded and open end 6 of the handle portion 1 of the casing, the slot 7 in the under side of said casing portion permitting the insertion of the member 4.

A closure cap 8, having an aperture 9 is adapted to be slid onto the adjacent end of the member 4 and screwed onto the threaded end 7 of the handle portion 1 of the casing, for the purpose of holding the supporting member 4 and its handle member 5 secured in proper relation with the said casing portion, (see Figures 2 and 7.)

While I have illustrated my invention as adapted for supporting a gathering bag, in Figures 1, 2, 3, 4 and 6, it will be readily apparent that the invention is just as effectively used in cooperation with a gathering bucket having the usual bail handle, such as illustrated in Figure 8. In this case, the slot 7 of the casing handle portion permits the insertion of the gathering bucket bail, and the end closure cap 8 is also provided with a slot 10, merging with the aperture 9 so that the said cap member may be properly applied around the said bucket bail, the usual wooden handle for the bucket serving as the equivalent of the wooden handle 5, see Figures 9 and 10.

By reference to Figure 10, it will also be readily apparent that, by extending the handle portion 1 of the casing the bucket bail and handle may be inserted into the said casing portion and held therein by a closure cap having neither slot or aperture.

By reference to Figures 1, 3 and 4, it will be seen that the supporting hook member 3, projecting through a slotway 11 formed in the casing portion 2, is curved downwardly to form an angled relation with the said casing portion such as will permit an effective hanging of the casing and its suspended load to a convenient tree limb, or other supporting medium, while the gathering process goes on.

Means is provided for holding the supporting hook member 3 locked to the position just above mentioned and further means is provided for properly releasing the locking means so that the said supporting hook member will be released from its supporting position so that the gatherer may remove the load from the tree limb without the necessity of lifting the weight of the load as would be the case with an ordinary hook without such releasable connections.

For practically providing for such locking and releasing of the supporting hook member 3 I provide the following mechanism. I pivot that end of the said member which extends into the casing upon a cross pin 12 which projects through the casing sides and through a combined casing strengthening and locking member 13 which has one end bent over the open top end of the casing portion 2 and the other end bent to form an angled foot portion 14 provided with a locking slot 15. A locking lever 16 is provided and the said lever has one end thereof pivotally joined as at 17 to the projected end of the supporting hook member 3, and the other end is projected through the locking slot 15 of the member 13 and is provided with a lock notch 18 adapted to cooperate with that slot in holding the member 3 to its normal position with relation to the casing portion 2. A leaf spring 19 is secured to the lever 16, projects through and engages the locking slot 15 and acts to normally hold the lock notch 18 in locked relation with the said slot, (see Figures 2 and 5) and, secured to the cross pin 12 and a projection 20 of one of the leaf spring retaining screws, is a coil spring 21 adapted to effect the proper return of the supporting hook member 3 to its normal locked position after the same has been released in the manner soon to be described.

Thus far it will be readily understood that by properly securing either the gathering bag or bucket upon the casing, in the manner hereinbefore described, and hooking the member 3 over a suitable support, such as is indicated in Figure 1, the gathering process may be proceeded with in a convenient manner and without any lifting or carrying strain on the gatherer.

It will also be readily understood that by providing a means for releasing the supporting hook member 3 from its locked position shown in Figures 1 and 2, the said member may be released when desired (see dot and dash lines on Figure 13) and allowed to slip off of the supporting medium without a lifting strain upon the gatherer. To accomplish this, I provide a releasing trigger member 22 pivoted upon a cross pin 23 and provided with a heel portion 24 adapted to engage the lever 16 to force the same out of locked engagement with the locking slot 15 against the action of the spring 19.

The trigger member 22 is placed in a position for being conveniently engaged by a finger of the gatherer when grasping the handle portion 1 of the casing and, assuming the gathering bag or bucket to be full or partially filled, the gatherer grasps the said handle portion and then presses the trigger, releasing the locked relation of the lever 16 and slot 15, and allowing the supporting hook member to swing up, under action of the load, to slip off of the tree limb and thereby transfer the weight of said load from the said tree limb to the arm of the gatherer.

The spring 21 serves to return the parts to normal or locked position after being released as just described, it being understood, of course, that the trigger member 22 is immediately released after being actuated.

The casing portion 1 is provided with slotways 25 and 26 to accommodate the movement of the trigger member 22 and the lever 16 and spring 19 respectively, (see Figures 2 and 7).

The top open end of the casing portion 2 may be pressed into a substantially rectangular shape to better accommodate the action of adjacent mechanism somewhat as illustrated in Figures 1, 2 and 4.

In Figures 10 and 11 are illustrated a slightly modified embodiment of my invention in which the means for returning the supporting hook member to normal locked position, is in the nature of a coiled spring 27 surrounding the pivot pin 12 and adapted to have one end 28 thereof engage the casing portion 2 and the other end 29 engage a heel portion 30 of the member 3. The said member 3 is also provided with a locking heel portion 31 adapted to be engaged, to hold the same locked to its operative or load hanging position, by a locking member 32 pivoted on a cross pin 33 and having an actuating lever projection 34 adapted to be link connected as at 35 with the arm 36 of the releasing trigger member 22. A spring 37 is secured as shown to cause the proper return of the locking member 32 to its normal position.

In Figures 12 and 13 is illustrated a still further modification of my invention in which the supporting hook member 3 is locked to its normal position by a double ended stout wire member 38 passed through an aperture in the crank portion of the said member 3, wrapped together as at 39 to form a portion 40, forming a bearing for the returning spring 41, and a locking end 42 and a spring end 43 adapted to pass through and coact with the lock slotway 44, as shown.

The spring end 43 holds the lock end 42 in engagement with the lock slot 44 and the trigger 22 is provided with a separated heel portion 45 and a cross pin 46 for engaging the locking end 42 for disengaging the same from its locked relation with the said slot 44.

From the foregoing description, taken in connection with the drawings, the novel details of construction, manner of operation and advantages of my invention will be readily apparent to those skilled in the art to which it relates.

What I claim is:—

1. A device of the class described, comprising a casing, a supporting member pivoted to said casing, means for holding the supporting member in position for supporting the casing, means for securing a load to said casing, means for effecting a release of the holding means to permit disengagement of the supporting member under load action, and a spring for returning the supporting member to its normal supporting position after it has passed free of the medium which supported it.

2. A device of the class described, comprising a casing, a supporting member pivoted to said casing, means for holding the supporting member in position for supporting the casing, means for securing a load to said casing, means for effecting a release of the holding means to permit disengagement of the supporting member under load action, and spring devices for returning the supporting member and the holding means therefor to their normal position first stated.

3. A device of the class described, comprising an L shaped casing, means for suspending a load from said casing, a supporting hook pivoted to the casing, a locking device for normally holding the hook in position for engaging a supporting medium for supporting said casing and load, and a trigger device for releasing the locking device to permit the supporting hook to automatically free itself from the supporting medium under the action of the weight of the load, and means for returning the supporting hook and the locking device to their normal position first stated.

4. A device of the class described, comprising an L shaped casing providing a horizontal handle portion and a vertical casing portion, means carried by the handle portion for suspending a load therefrom, a supporting hook pivoted to the vertical casing portion, a locking device for locking the hook to its normal supporting position against upward movement and to facilitate engagement thereof with a supporting medium for supporting the casing and load, and a trigger device for releasing the locking device to cause the supporting hook to automatically free itself of the supporting medium by relative upward movement thereof and by reason of downward movement of casing and load occasioned by gravity.

5. A device of the class described, comprising an L shaped casing providing a horizontal handle portion and a vertical casing portion, means carried by the handle portion for suspending a load therefrom, a supporting hook pivoted to the vertical casing portion, a locking device for locking the hook to its normal supporting position against upward movement and to facilitate engagement thereof with a supporting medium for supporting the casing and load, and a trigger device carried by the handle portion in position for being readily engaged by a finger of a hand grasping the same with a view to sustaining the load when released and adapted for releasing the locking device to cause the supporting hook to automatically free itself of the supporting medium by relative upward movement thereof and by reason of downward movement of casing and load occasioned by gravity, and spring devices for returning the supporting hook and the locking device to their normal positions first stated.

6. A device of the class described, comprising a casing, a supporting hook member pivoted to said casing, means for holding said hook locked in one position relative to said casing, means for releasing said hook member from said locked position, said casing being provided with a slot whereby a bail handle may be admitted into said casing to be held thereby, and a cap member for closing the end of said casing.

7. A device of the class described, comprising a casing, a supporting hook member pivoted to said casing, means for holding said hook locked in one position relative to said casing, means for releasing said hook member from said locked position, and a load carrying member removably secured to said casing and comprising a casing engaging handle portion and a substantially U-shaped body with hook ends.

8. A device of the class described, comprising a casing, a supporting hook member pivoted to said casing, means for holding said hook locked in one position relative to said casing, means for releasing said hook member from said locked position, and a load carrying member comprising a casing engaging handle portion and a substantially U-shaped body with hook ends, and means whereby said load carrying member may be removably secured to said casing.

9. A device of the class described, comprising a casing, a supporting hook member pivoted to said casing, means for holding said hook locked in one position relative to said casing, means for releasing said hook member from said locked position, a load carrying member comprising a casing engaging handle portion and a substantially U shaped body with hook ends, said casing being provided with a slot whereby said load carrying member may be admitted into said casing to be held thereby, and a cap member for closing the end of said casing.

10. A device of the class described, comprising a casing, a supporting hook member pivoted to said casing, a strengthening and locking member in said casing and provided with a locking slot, a locking lever pivoted to said supporting hook and having a lock notch cooperative with the locking slot of said locking and strengthening member, means for holding said locking lever notch in cooperative engagement with said lock notch, means for moving said notch and slot out of cooperative engagement, and means for supporting a load on said casing.

11. In a device of the class described, a support having a handle portion, a supporting hook pivoted in one portion of said support, means for holding said hook against movement and including a releasing trigger mounted on another part of said support, means to hold a receptacle carrying bail on said handle portion of said support adjacent said trigger whereby said support may be grasped with said bail and the trigger released by the same hand.

JOHN KLINGELE.